Patented Jan. 30, 1923.

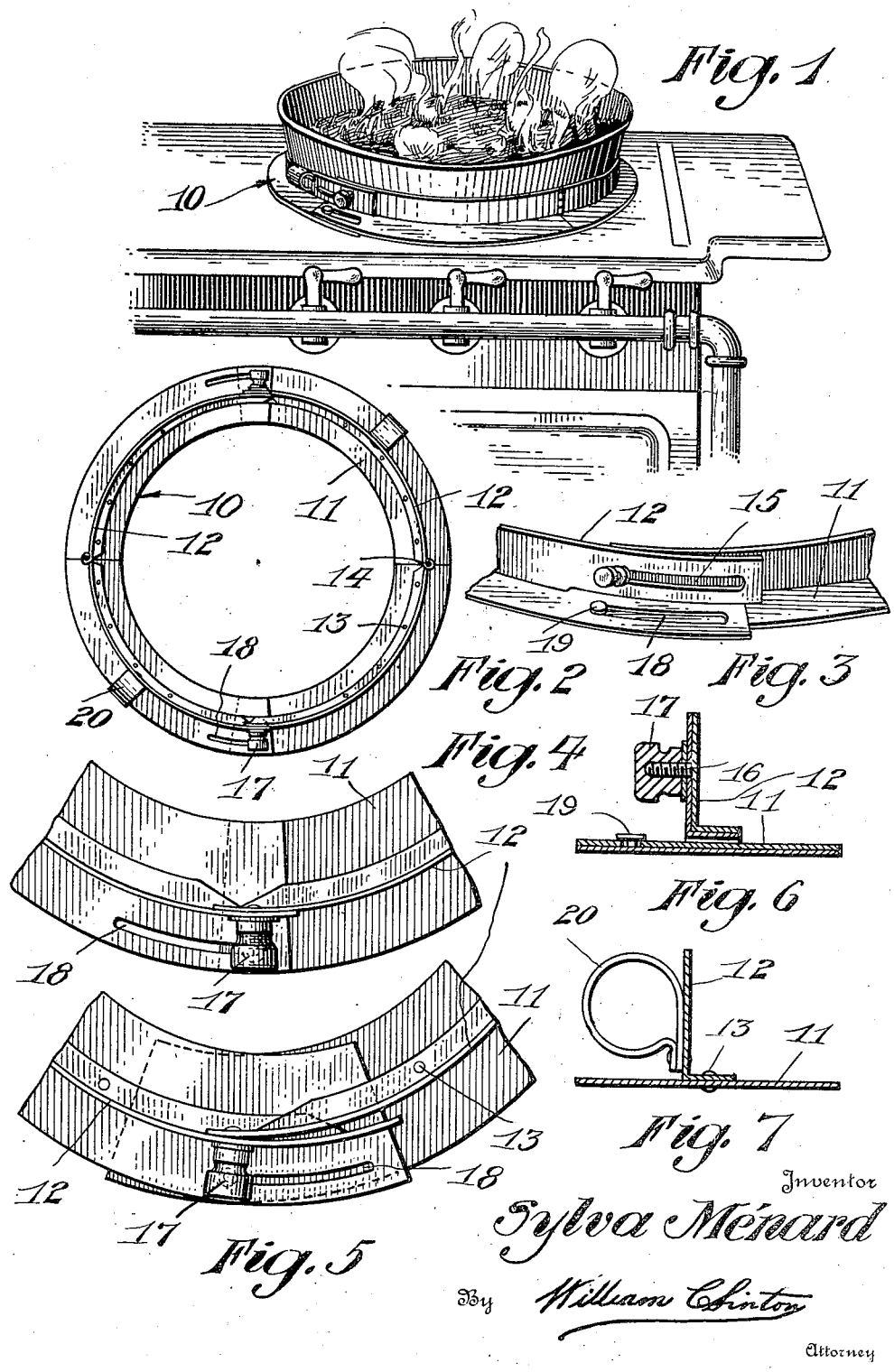

1,443,883

UNITED STATES PATENT OFFICE.

SYLVA MÉNARD, OF MONTREAL, QUEBEC, CANADA.

COOKING APPLIANCE.

Application filed August 2, 1921. Serial No. 489,262.

*To all whom it may concern:*

Be it known that I, SYLVA MÉNARD, a subject of the King of Great Britain, residing at Montreal, in the Province of Quebec, Canada, have invented certain new and useful Improvements in Cooking Appliances; and I do hereby declare that the following is a full, clear, and exact description of the invention, such as will enable others skilled in the art to which it appertains to make and use the same.

The present invention relates to new and useful improvements in cooking appliances.

The primary object of the invention is the provision of a cooking appliance adapted to receive dishes, pans or other receptacles for cooking purposes and to protect the lower edge thereof where the side walls and the bottom connect, for the purposes of preventing burning or cracking this particular part of the receptacles and directing the flames toward the center of the receptacles for more efficient use.

Another object of the invention is the provision of an appliance, such as above referred to which is adaptable for receiving and holding various sized receptacles.

A further object of the invention is the provision of means whereby the said appliance may be readily adjustable and locked in such adjusted position, together with means for supporting the same so it can be lifted from the stove.

A still further object of the invention is the provision of an appliance such as above referred to which will be comparatively simple and inexpensive to manufacture, reliable and efficient in use, and readily operated.

With the above and other objects in view, the present invention resides in the novel features of construction, formation, combination and arrangements of parts to be hereinafter more fully described, claimed, and illustrated in the accompanying drawing forming a part of the present application; and in which;

Figure 1 is a perspective view of a stove showing my invention applied thereto;

Figure 2 is a plan view of the appliance removed;

Figure 3 is a perspective view of one edge thereof;

Figure 4 is a plan view of that portion shown in Figure 3 with the receptacle expanded;

Figure 5 is a similar view showing it contracted;

Figure 6 is a transverse sectional view taken through the locking means; and,

Figure 7 is a similar view showing one of the handles.

Referring now to the accompanying drawing by corresponding characters of reference throughout the several views, the numeral 10 designates in general my improved appliance, which is of circular formation as clearly shown in the drawing, including a plurality of segmental sections 11 which comprise flat plates having upstanding flanges 12 secured thereto as at 13. The intermediate ends of the flanges 12 are hinged together as at 14, whereby the device may be expanded or contracted at will, while the opposite ends of the flanges are slidably connected relative to each other as clearly shown in Figures 4 and 5, the outer of the flanges being provided with slots 15 through which pins 16 project. These pins 16 are carried by the flanges 12 and have threaded engagement with knobs 17 by means of which the said flanges can be locked in their adjusted position relative to each other. The upper of the sections 11 are likewise formed with slots 18 through which pins 19 extend. These pins 19 are provided with suitable heads for preventing any displacement of the sections relative to each other.

The flanges 12 above referred to, are likewise provided with suitable handles 20 arranged in diametrically opposite points upon the flanges whereby the same can be conveniently grasped and lifted from the stove when desired.

After the device has been adjusted to the size of the receptacle, the knobs 17 may be tightened to lock said receptacle in the desired position, and it will be noted that the inner edges of the flat plates project inwardly of the flanges 12, deflecting the flames toward the center of the receptacle and preventing the burning around the outer edges.

From the foregoing description taken in connection with the accompanying drawing, it will be manifest that a cooking appliance of the nature described is provided which will fulfill all of the necessary requirements of such a device, and it should be understood in this connection, that various minor changes in the specific details of construction, can be resorted to within the scope of the appended claims, without departing from the spirit or sacrificing any of the advantages of the invention.

Having thus fully described the invention, what I claim as new and desire to secure by Letters Patent is:

1. The herein described cooking appliance comprising a plurality of segmental sections, certain of said sections being hinged at one end and slidably overlapping at their opposite ends, and means for locking said sections in their adjusted position.

2. The herein described cooking appliance comprising a plurality of segmental sections, flanges extending laterally from said sections, said flanges being slidably connected, and handles secured to said flanges.

3. The herein described cooking appliance, comprising a plurality of segmental sections, hingedly connected at certain ends thereof, and slidable longitudinally of each other at the opposite ends thereof, means for locking said sections against displacement and handles carried by the sections substantially as and for the purposes set forth.

4. The herein described apparatus comprising a plurality of segmental sections, means for hingedly connecting said sections, flanges formed upon said sections, and spaced outwardly from the inner edges of said sections, the ends of said sections being slidable upon each other, means for locking said flanges and sections against displacement in their various adjusted positions, and handles carried by certain of the flanges, substantially as and for the purposes set forth.

In witness whereof I have hereunto set my hand.

SYLVA MÉNARD.